United States Patent
Kameda et al.

(10) Patent No.: US 7,924,669 B2
(45) Date of Patent: Apr. 12, 2011

(54) OPTICAL DISK DEVICE AND RECORDING METHOD

(75) Inventors: Hiroyuki Kameda, Osaka (JP); Takayuki Ono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 350 days.

(21) Appl. No.: 12/268,474

(22) Filed: Nov. 11, 2008

(65) Prior Publication Data

US 2009/0129224 A1 May 21, 2009

(30) Foreign Application Priority Data

Nov. 15, 2007 (JP) ................................ 2007-296171

(51) Int. Cl.
*G11B 7/00* (2006.01)
(52) U.S. Cl. .................................................. 369/47.53
(58) Field of Classification Search .............. 369/47.5, 369/47.53, 53.22
See application file for complete search history.

(56) References Cited

U.S. PATENT DOCUMENTS

| | | | |
|---|---|---|---|
| 2003/0043711 A1* | 3/2003 | Mashimo et al. | 369/47.39 |
| 2004/0160877 A1* | 8/2004 | Yamamoto et al. | 369/53.22 |
| 2006/0044974 A1* | 3/2006 | Nakamura et al. | 369/53.1 |
| 2006/0256679 A1* | 11/2006 | Chang et al. | 369/47.5 |

FOREIGN PATENT DOCUMENTS

| | | |
|---|---|---|
| JP | 11-328709 A | 11/1999 |
| JP | 2002-208139 A | 7/2002 |
| WO | WO2006/001423 A1 | 1/2006 |

* cited by examiner

*Primary Examiner* — Thang V Tran
*Assistant Examiner* — Latanya Bibbins
(74) *Attorney, Agent, or Firm* — Global IP Counselors

(57) ABSTRACT

An optical disk device includes a test recording portion, a power control portion, a recording portion and a power correction portion. The power control portion determines a first recording power to record recording information to the optical disk based on test information recorded by the test recording portion. The power correction portion calculates a first average of modulation of the recording information recorded on a first track of the optical disk at the first recording power and a second average of modulation of the recording information recorded on a second track of the optical disk at the first recording power. The power correction portion increases the first recording power to a second recording power when the second average of the modulation drops below a first threshold value that is preset and drops below a second threshold value that is calculated based on the first average of modulation.

10 Claims, 12 Drawing Sheets

OPTICAL DISK DEVICE AND RECORDING METHOD

CROSS-REFERENCE TO RELATED APPLICATIONS

This application claims priority to Japanese Patent Application No. 2007-296171 filed on Nov. 15, 2007. The entire disclosure of Japanese Patent Application No. 2007-296171 is hereby incorporated herein by reference.

BACKGROUND OF THE INVENTION

1. Field of the Invention

The present invention generally relates to an optical disk device. More specifically, the present invention relates to an optical disk device that records information to a recording medium.

2. Background Information

CD-R disks, CD-RW disks, DVD-R disks, DVD-RW disks, DVD+R disks, DVD+RW disks, DVD-RAM disks, DVD+RAM disks, and other such optical disk medium (e.g., recording medium or optical disk) have been used for some years now. CD-R/RW drives, DVD-R/RW drives, DVD+R/RW drives, DVD-RAM drives, DVD+RAM drives, and other such information recording devices used to record information to the optical disk medium are designed so that rotation of the optical disk medium is controlled, recording power of laser beam (e.g., light beam) emitted from a light source is controlled to a target value, and information is recorded by converging the laser beam emitted from the light source on the optical disk medium.

With the optical disk devices, an optimal laser power for recording to the optical disk medium (e.g., optimal recording power) varies according to conditions, such as recording characteristics of the optical disk medium, recording speed, and variance in performance between individual devices. Thus, processing for determining the optimal recording power has to be carried out prior to recording actual information (e.g., actual data) to the optical disk medium.

For example, when the information is recorded to a DVD-RW disk, test information is written while progressively varying the recording power in a test recording area (e.g., power calibration area; PCA) of the optical disk medium. Then, an optimal recording power is determined by detecting signal for the test information written in the test recording area. This determination of the optimal recording power is called optimum power control (OPC) in the case of CD-R disks. A specific range over which the recording power is progressively varied during the OPC is called an "OPC range."

Subsequent recording operations are carried out by emitting the laser beam at the optimal power ascertained by the OPC processing. In recording (specifically, overwriting) of new information in a recording area where information has already been recorded, the laser beam is emitted at the optimal power directly without performing an independent erasure operation. This is generally referred to as a direct overwrite.

The recording characteristics for the DVD-RW disks and other such optical disk medium will vary with types of optical disk medium being used. Therefore, the recording power needed to record information will also vary, which means that with the optical disk devices, a median power (Pdef) of the recording power is often stored separately in executing the OPC for each type of optical disk medium. Also, the recording characteristics vary greatly among individual optical disk medium, or depending on a manufacturing process thereof, and particularly between inner and outer peripheries of the optical disk medium.

To record to the optical disk medium having such variance in the recording characteristics, with a conventional optical disk device, after the optimal recording power has been determined by the OPC, the optimal recording power is corrected with correction data that has been stored ahead of time (see Japanese Laid-Open Patent Application No. H11-328709, for example).

With the conventional information recording device, however, because of some kind of variance in the conditions, such as the recording characteristics of the optical disk medium, the recording speed, or various in the performance among individual devices in the OPC, even if recording is actually performed at the optimal recording power determined by the OPC, various problems may be encountered in terms of worse jitter or an increased reproduction error rate. This situation is not at all desirable from a standpoint of properly recording or reproducing data.

There are two types of factors that explain why the recording is not performed in the optimal state even if the recording is actually performed at the optimal recording power determined by the OPC. One is factors in the optical disk device that performs recording to the optical disk medium, and the other is factors in the optical disk medium itself.

In regards to the factors in the optical disk device, a difference between the recording power set for the optical disk device and the recording power of the light beam actually emitted at the recording power, slight variance in an oscillation frequency of a laser diode, an imbalance in a focus servo of the light beam, deviation between the light beam emitting lens face of an optical pickup in which a light source is installed and a face of the optical disk medium (this is called tilt), variance in recording pulse waveform of the light beam, and other such problems with manufacturing tolerance are possible factors preventing recording from being performed in the optimal state even when the recording is actually carried out at the optimal recording power determined by the OPC.

In regards to the factors in the optical disk medium, variance in recording sensitivity characteristics is the primary culprit. The variance in recording sensitivity characteristics mainly occurs in a process of manufacturing the optical disk medium. The optical disk medium has a recording layer and a protective layer produced by applying a coating of a polycarbonate or the like to a top face of the recording layer. To produce the optical disk medium efficiently, a step of applying the coating involves dropping a polycarbonate liquid near an inner periphery of a rotating optical disk medium. Then, the polycarbonate spreads to an outer periphery under the centrifugal force of the rotation.

In terms of the structure of the optical disk medium, in an ideal state the protective layer preferably has a uniform thickness over the entire surface of the optical disk medium. However, with the method discussed above, the thickness of the protective layer ends up being different at the inner and outer peripheries. Thus, the refractive index of the protective layer adversely affects reflectance of the light beam from the recording face at the inner and outer peripheries due to the difference in thickness, which tends to have an adverse effect on recording characteristics. The recording layer of the optical disk medium has lands and grooves. The lands form convex components. The grooves form concave components. The lands and grooves are formed in a spiral pattern in a track direction. The greater is the difference in reflectance between the lands and grooves, the better are the recording characteristics. Furthermore, the thickness and refractive index of the protective layer adversely affect the reflectance at the inner and outer peripheries as discussed above. In general, the thickness of the protective layer is less at the inner periphery, while the thickness of the protective layer is greater at the outer periphery. In addition to the thickness of the protective layer, if a coating agent contains a large amount of impurities, this can also increase the refractive index of the protective layer and have a major adverse effect on reflectance.

Also, the lands and grooves are formed by pressing a mold called a stamper against the optical disk medium under powerful pressure. However, when the lands and grooves are formed with the stamper that has been deformed by excessive use, the lands and grooves usually formed on a vertical or horizontal face with respect to the light beam are formed on a face that is inclined with respect to the light beam, which affect the reflectance. Similarly, reflectance is affected when warping occurs in the optical disk medium itself. Thus, with the optical disk medium, variance in the thickness of the protective layer, the impurity content of the protective layer, variance between stampers, and other such problems with tolerance in a manufacturing process are considered to be factors that may prevent recording from being performed in the optimal state even though the recording is actually performed at the optimal recording power determined by the OPC.

Because of the factors, even if the recording power is determined by the OPC in the test recording area, if any of the various types of variance mentioned above is present in the optical disk device, or if there is a large difference in the reflectance between the inner and outer peripheries of the optical disk medium, then recording cannot be performed in the optimal state. Thus, even if the recording power determined by the OPC is corrected, it will be difficult to accommodate a large change in the recording characteristics at the outer periphery, jitter will be worse, or the reproduction error rate will increase. As a result, video data cannot be outputted.

In view of the above, it will be apparent to those skilled in the art from this disclosure that there exists a need for an improved optical disk device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide an optical disk device with which recording quality to an optical disk is stabilized.

In accordance with one aspect of the present invention, an optical disk device includes a test recording portion, a power control portion, a recording portion and a power correction portion. The test recording portion is configured to record test information on a predetermined test recording area of an optical disk. The power control portion is configured to determine a first recording power to record recording information to the optical disk based on the test information recorded by the test recording portion. The recording portion is configured to record the recording information to the optical disk at the first recording power. The power correction portion is configured to calculate a first average of modulation of the recording information recorded on a first track of the optical disk at the first recording power and a second average of modulation of the recording information recorded on a second track of the optical disk at the first recording power with the second track of the optical disk being located away from the first track of the optical disk in a radial direction of the optical disk. The power correction portion is further configured to increase the first recording power to a second recording power so that the recording portion records the recording information at the second recording power when the second average of the modulation drops below a first threshold value that is preset and drops below a second threshold value that is calculated based on the first average of modulation.

With the optical disk device of the present invention, it is possible to provide an optical disk device with which recording quality to an optical disk is stabilized.

These and other objects, features, aspects and advantages of the present invention will become apparent to those skilled in the art from the following detailed descriptions, which, taken in conjunction with the annexed drawings, discloses selected embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENT

Selected embodiments of the present invention will now be explained with reference to the drawings. It will be apparent to those skilled in the art from these disclosures that the following descriptions of the selected embodiments of the present invention are provided for illustration only and not for the purpose of limiting the invention as defined by the appended claims and their equivalents.

First Embodiment

Figure 1:
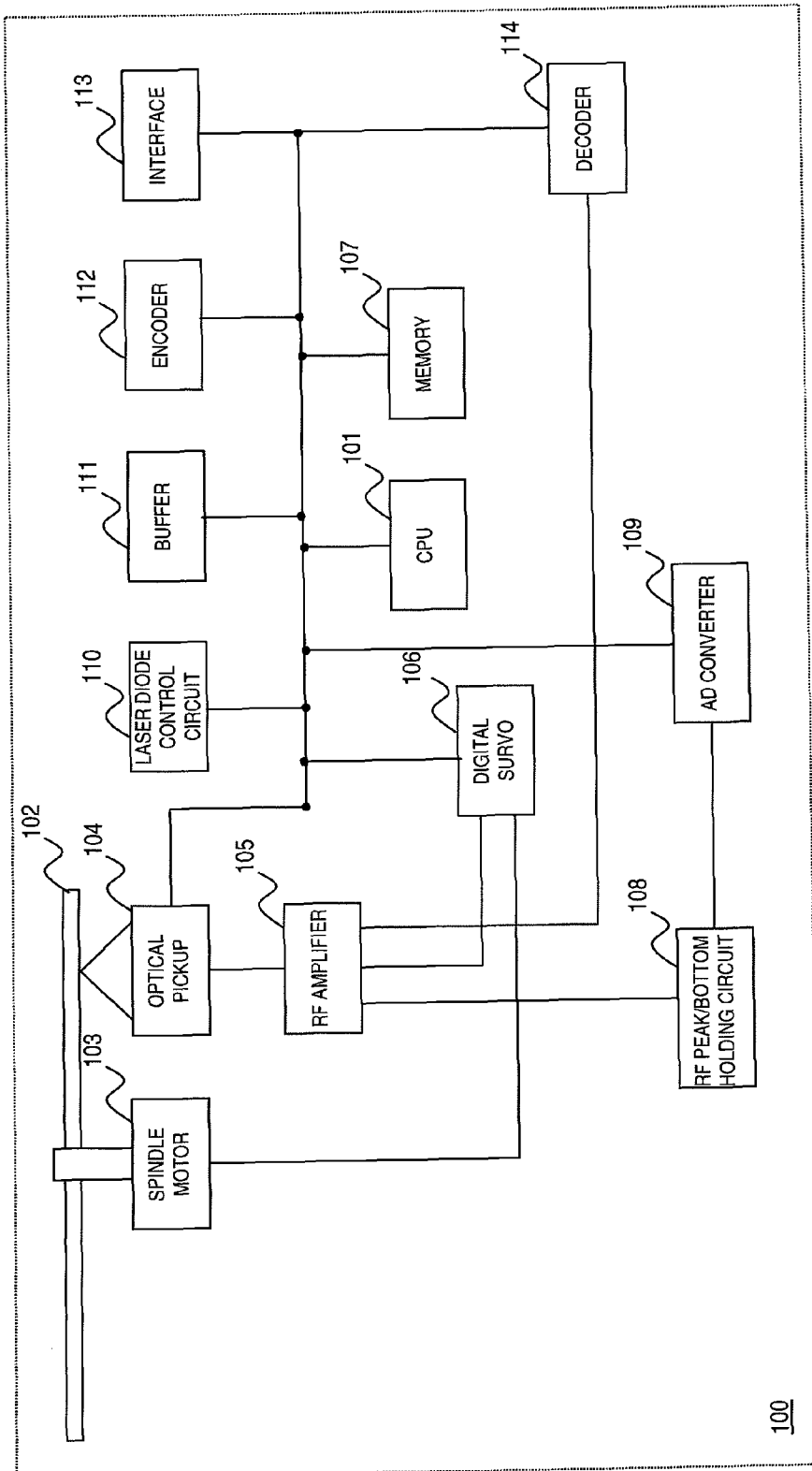
FIG. 1 is a block diagram of an optical disk device in accordance with a first embodiment of the present invention.

FIG. 1 shows a block diagram schematically illustrating an optical disk device 100. The optical disk device 100 is a device for recording information (e.g., recording information) to an optical disk 102 and reading the recording information recorded on the optical disk 102, under the control of a CPU 101. The optical disk 102 includes an optical disk such as a DVD or a CD. The optical disk 102 is not limited to being disk-shaped, however, and any optical disk can be used in the optical disk device 100 as long as it allows the recording information to be recorded by irradiation with a laser beam.

The optical disk device 100 includes the CPU 101, a spindle motor 103, an optical pickup 104, an RF amplifier 105, a digital servo 106, a memory 107, an RF peak/bottom holding circuit 108, an A/D converter 109, a laser diode control circuit 110, a buffer 111, an encoder 112, an interface 113, and a decoder 114.

The spindle motor 103 rotates and stops the optical disk 102. The spindle motor 103 is operated during access to the optical disk 102. More specifically, the spindle motor 103 is constructed so as to receive a spindle servo from the digital servo 106, etc., rotate the optical disk 102 at a specific speed, and stop the optical disk 102.

The optical pickup (e.g., recording portion) 104 performs recording and reproduction to and from the optical disk 102. The optical pickup 104 further includes a laser device (e.g., laser diode or light source) and a lens (e.g., objective lens). More specifically, the laser device of the optical pickup 104 irradiates the optical disk 102 with a laser beam or other such light beam at a first power as reading light during reproduction, and irradiates at a second power, under modulation, as a writing light during recording. The laser device has a semiconductor laser. The objective lens converses the laser beam emitted by the laser device on the optical disk 102 to record the information.

The RF amplifier 105 detects an RF signal (e.g., reproduction signal) by receiving reflected light from the laser beam emitted by the optical pickup 104. It also detects from the detected RF signal a servo signal for controlling the operation of the spindle motor 103, the optical pickup 104, etc.

The digital servo 106 controls the spindle motor 103 based on the servo signal detected by the RF amplifier 105. More specifically, the digital servo 106 controls the rotational speed, etc., of the optical disk 102. The CPU 101 is operatively connected to the digital servo 106, the memory 107, the laser diode control circuit 110, the encoder 112, and the decoder 114. The CPU 101 sends commands to the various components, or transfer data to and from the various components, thereby controlling the entire optical disk device 100.

The memory (e.g., memory portion) 107 is used in the entire data processing performed in the optical disk device 100. The memory 107 includes a ROM region in which are stored programs for performing the operation of the optical disk device 100, and a RAM region in which are stored the parameters required for program operation or that is used as buffers used for compressing and expanding video data, and so forth.

The RF peak/bottom holding circuit 108 detects peak and bottom values of the RF signal detected by the RF amplifier 105. More specifically, the RF peak/bottom holding circuit 108 includes an envelope wave detector, for example. The A/D converter 109 converts an analog signal outputted from the RF peak/bottom holding circuit 108 into a digital signal. The laser diode control circuit 110 controls the intensity of the laser beam emitted from the optical pickup 104 by oscillating the laser device of the optical pickup 104 at a specific frequency.

The buffer 111 temporarily stores content data that is to be recorded. More specifically, the content data encoded by the encoder 112 is recorded to the optical disk 102 after first been temporarily stored in the buffer 111. The buffer 111 is also used to store time data for switching the optical pickup 104 between recording and reproduction, for performing reproduction simultaneously with recording, in order to calculate modulation value in a recorded region of the optical disk 102. The buffer 111 can also include a RAM, a flash memory, or another such semiconductor memory.

The encoder 112 subjects recording data to DVD modulation (that is, DVD encoding), and output to the buffer 111. An example of DVD modulation is 8-16 modulation.

The interface 113 allows user commands to be inputted from outside in order to control the operation of the optical disk device 100. The interface 113 can be, for example, a remote control, a touch panel, a control button or panel, a mouse, a keyboard, or any of various other input devices. The input devices are connected to a PC (personal computer) or DVD recorder unit, and data exchange is usually performed by ATAPI.

The decoder 114 uses a specific table to demodulate RF signals, and produces reproduction data. For example, when 8-16 modulation is used as the modulation system, 16-bit pit data is converted into 8-bit reproduction data. Descramble processing, in which a sequence of the reproduction data is rearranged according to a predetermined rule, is then executed, and the processed reproduction data is outputted. The configuration can also be such that the reproduction data is subjected to error correction processing, interpolation processing, or the like.

After this, the reproduction data is decoded by an MPEG decoder, for example, is outputted via an external output interface to any of various displays, various projectors, various speakers, or other such external output devices, and is reproduced. Thus, the optical disk device 100 includes the function of an information reproduction device, or the function of an information recording and reproduction device.

Figure 9:
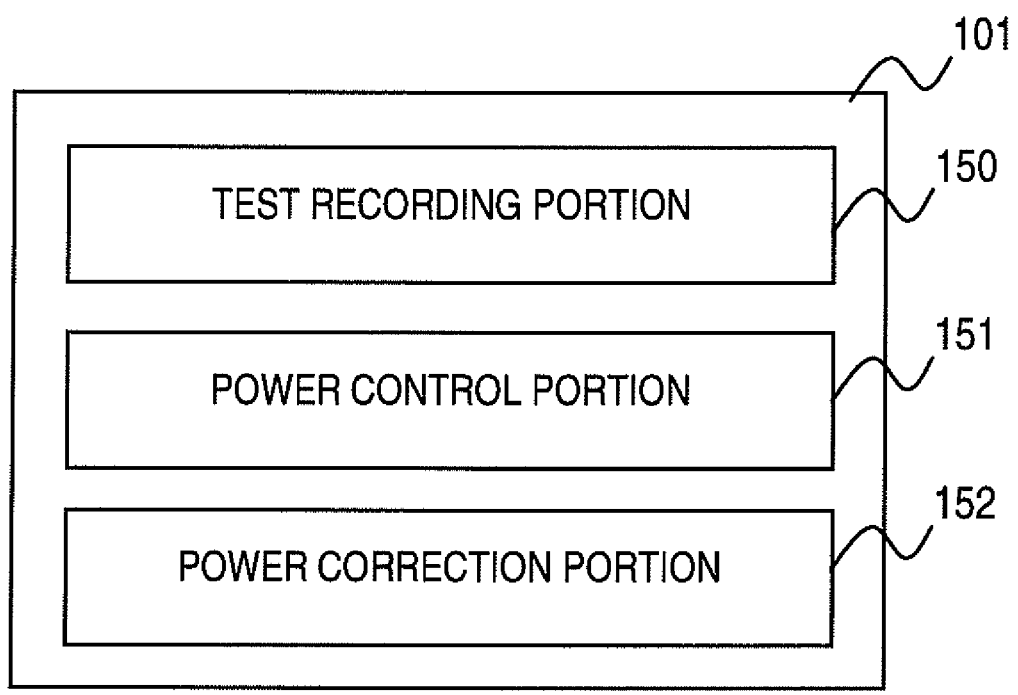
FIG. 9 is a block diagram showing a functional configuration of a CPU of the optical disk device illustrated in FIG. 1.

As shown in FIG. 9, the CPU 101 includes a test recording portion 150, a power control portion 151 and a power correction portion 152. The test recording portion 150 and the power control portion 151 perform an OPC (optimum power control) processing. Specifically, the test recording portion 150 records an OPC pattern or other such test signal (e.g., test information) on a PCA (Power Calibration Area) (e.g., predetermined test recording area). The power control portion 151 determines an optimal recording power (e.g., first recording power) of the laser device based on the OPC pattern recorded by the test recording portion 150. The power correction portion 152 performs a power correction processing. Specifically, the power correction portion 152 calculates an average value (e.g., first average) α of modulation of recording the recording information recorded on one track (e.g., first track) of the optical disk 102 at the optimal recording power and an average value (e.g., second average) β of the modulation of the recording information recorded on a track (e.g., second track) of the optical disk 102 at the optimal recording power. The track is located away from the one track in a radial direction of the optical disk 102. Furthermore, the power correction portion 152 further increases the optimal recording power to a corrected recording power (e.g., second recording power) when the average value β drops below a first threshold value and drops below a second threshold value that is calculated based on the average value α.

Figure 2:
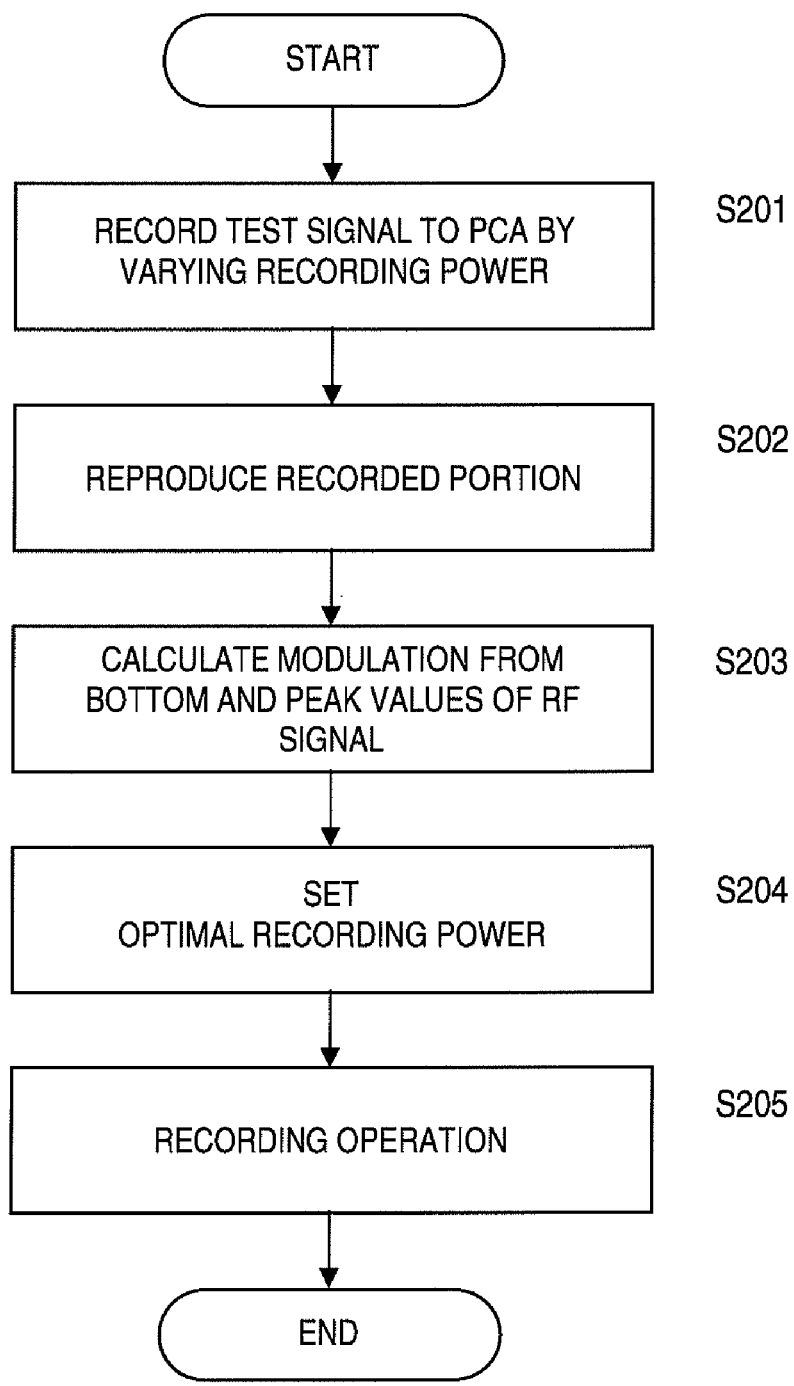
FIG. 2 is a flowchart illustrating an OPC processing performed in the optical disk device illustrated in FIG. 1.

The OPC processing will now be described briefly through reference to FIG. 2. FIG. 2 is a flowchart illustrating the OPC processing, out of the entire recording operation of the optical disk device 100.

As shown in FIG. 2, first, when the optical disk 102 is loaded, a seek operation is performed by the optical pickup 104 under control of the CPU 101. Then, various management data needed for recording to the optical disk 102 are acquired. The recording of data to the optical disk 102 is performed, for example, according to commands from the interface 113, etc., under the control of the CPU 101 based on the management data.

Then, under control of the test recording portion 150 of the CPU 101, the OPC pattern is recorded under varied recording power of the laser beam in the PCA of the optical disk 102 (step S201). In other words, the OPC processing is performed. The PCA is provided to a lead-in area located on the inner peripheral side of the optical disk 102, or to a lead-out area located on the outer peripheral side of the optical disk 102. The PCA is provided as an area for performing the OPC processing.

Figure 3:
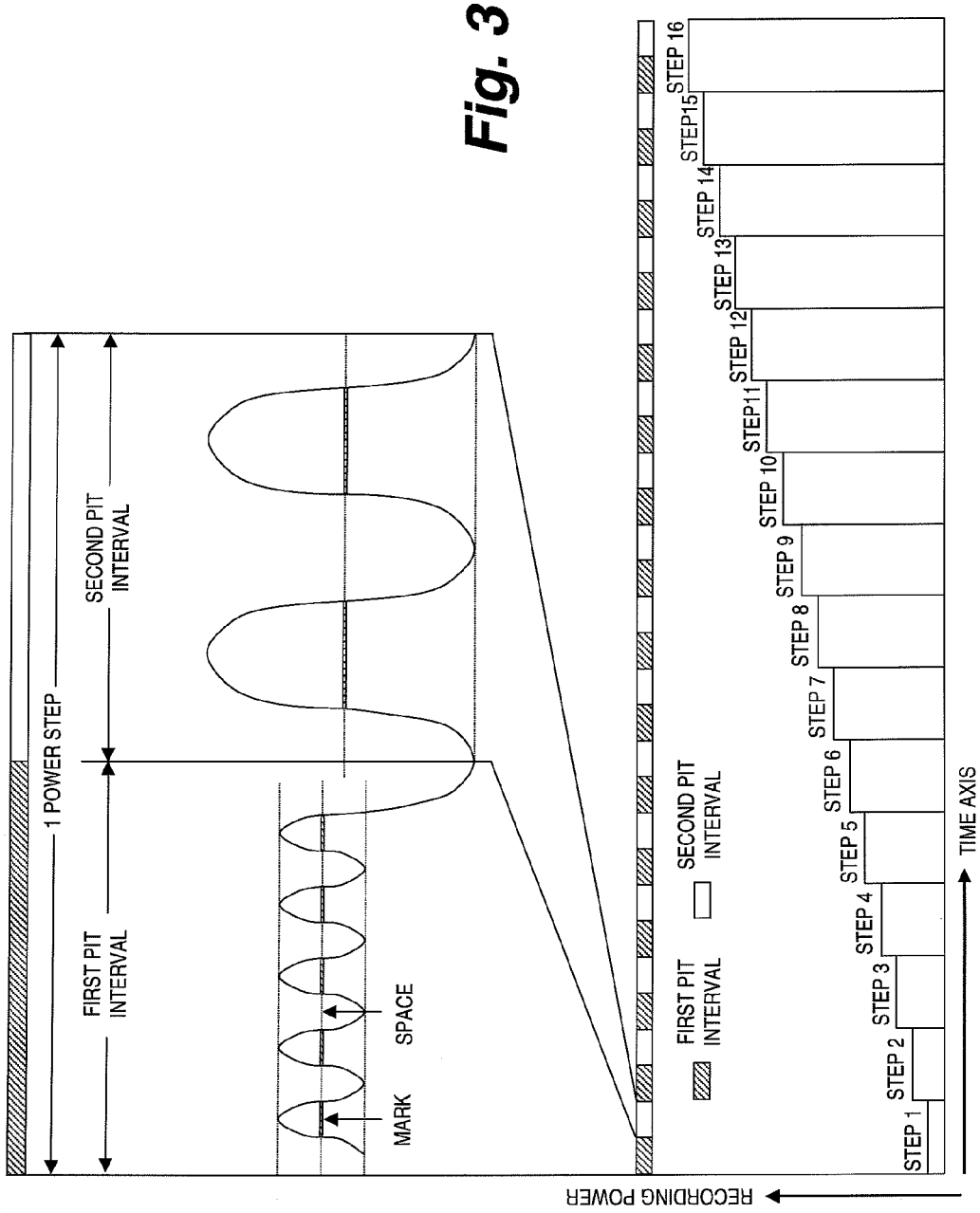
FIG. 3 is a schematic diagram illustrating an OPC pattern recorded in the OPC processing.

The OPC processing will now be further described in detail through reference to FIG. 3. FIG. 3 is a schematic timing chart illustrating a single iteration of the OPC processing, with 16 power steps, in the operation of the optical disk device 100. First, under the control of the test recording portion 150 of the CPU 101, the optical pickup 104 is moved to the PCA provided on the optical disk 102. Then, the recording power is switched in progressive steps (such as 16 mutually different steps), and the OPC pattern is recorded to the PCA. More specifically, the OPC pattern is recorded as shown in FIG. 3. The OPC pattern is produced according to a specific strategy under the control of the CPU 101. FIG. 3 illustrates a specific example of a mode in which the OPC pattern including first and second pit intervals at which the test signals are recorded, respectively, is recorded for each of the recording powers that are switched in steps. Naturally, the configuration can be such that a different OPC pattern is used for each of the recording powers that are switched in steps.

The laser diode control circuit 110 drives the laser device of the optical pickup 104 so that the recording power is switched in progressive steps according to the OPC pattern.

Returning to FIG. 2, upon completion of the recording of the test signal in the PCA, the recorded portion of the PCA (that is, the OPC pattern) is reproduced (step S202). The modulation value is then calculated from the RF peak and bottom values of the reproduced RF signal, for each recording power (step S203). More specifically, the peak and bottom values of the envelope detection of RF signals are sampled by the operation of the RF peak/bottom holding circuit 108 for each of the recording powers switched in steps. The reproduction of the OPC pattern is performed according to the number of times the OPC pattern has been recorded, for example, in a single iteration of the OPC processing. This is because the more often the OPC pattern is recorded, the greater is the recorded portion, and that much more sampling data can be acquired, allowing a more optimal recording power to be calculated.

Figure 4:
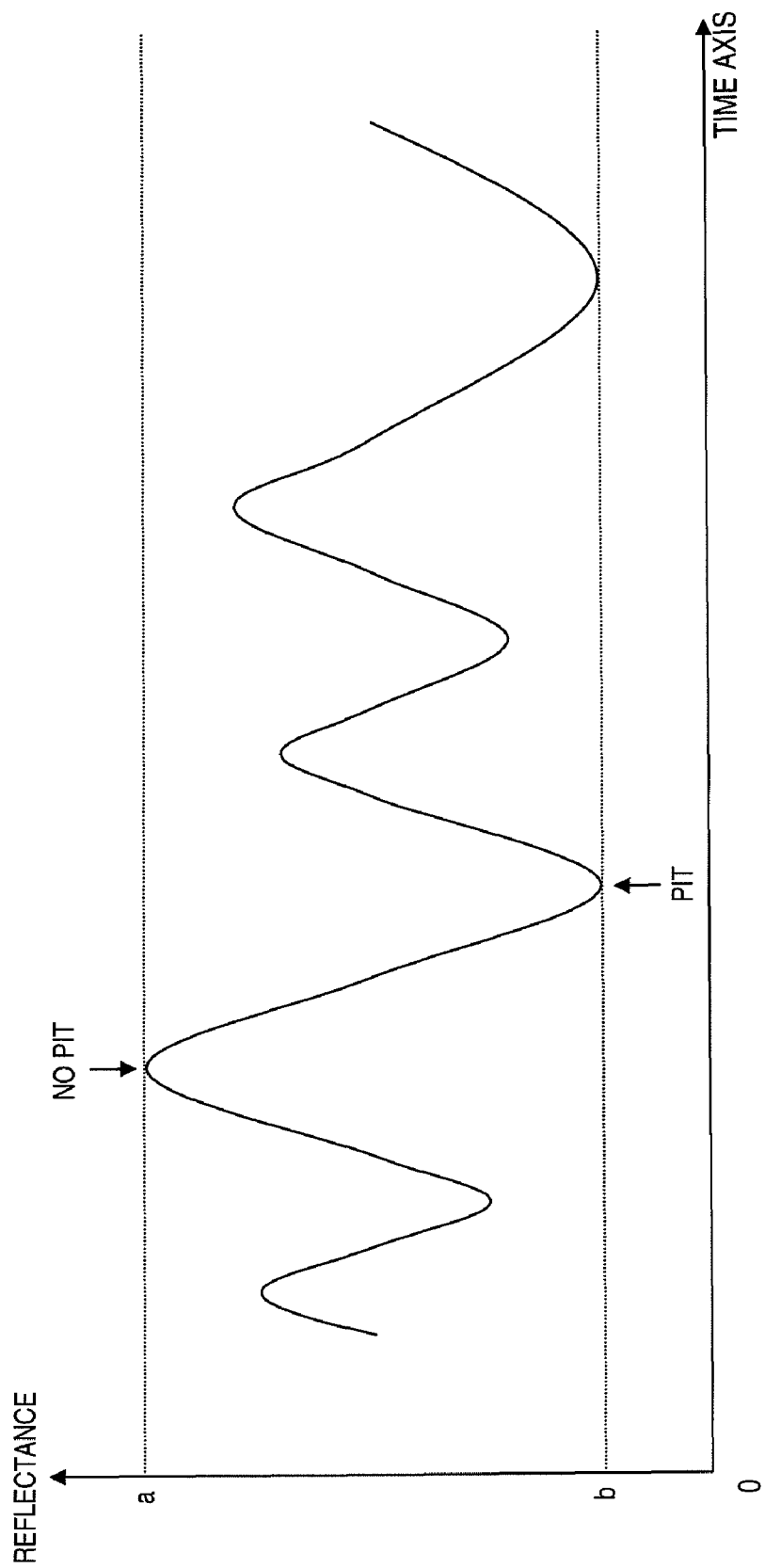
FIG. 4 is a schematic graph illustrating a waveform of an RF signal reproduced by the optical disk device illustrated in FIG. 2.

The modulation value calculated from the RF signal will now be described through reference to FIG. 4. FIG. 4 is a graph schematically illustrating a waveform of the RF signal reproduced by the optical disk device 100. As shown in FIG. 4, the RF signal when reproducing the portion in which pits have been formed on the optical disk 102 has reflectance that is relatively lower. On the other hand, the RF signal when reproducing the portion in which pits have not been formed on the optical disk 102 has reflectance that is relatively higher.

The modulation value "m" is calculated as follows:

$$m=(a-b)/a.$$

Here, "b" is the minimum reflectance of the RF signal, and "a" is the maximum reflectance of the RF signal.

The modulation value m is thus calculated for each of the recording powers switched in progressive steps.

Returning to FIG. 2, the optimal recording power in the OPC processing is calculated based on the modulation value m calculated in step S203 (step S204). The optimal recording power calculated by the power control portion 151 of the CPU 101 here is recorded to the memory 107. The video/audio data desired by the user is then recorded at the optimal recording power (step S205).

Figure 5A:
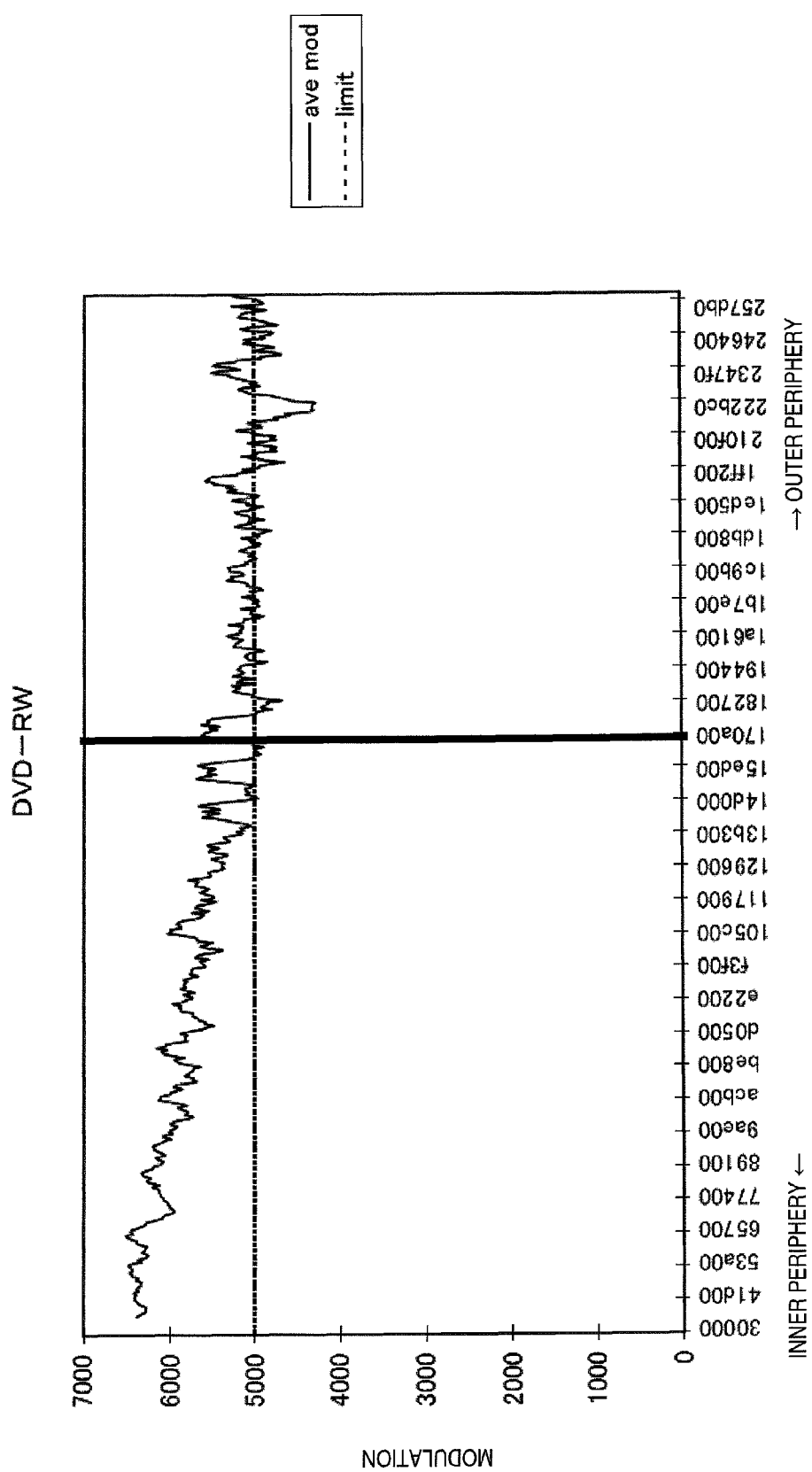
FIG. 5A is a graph showing a relationship between a modulation value and an address of an optical disk.
Figure 5B:
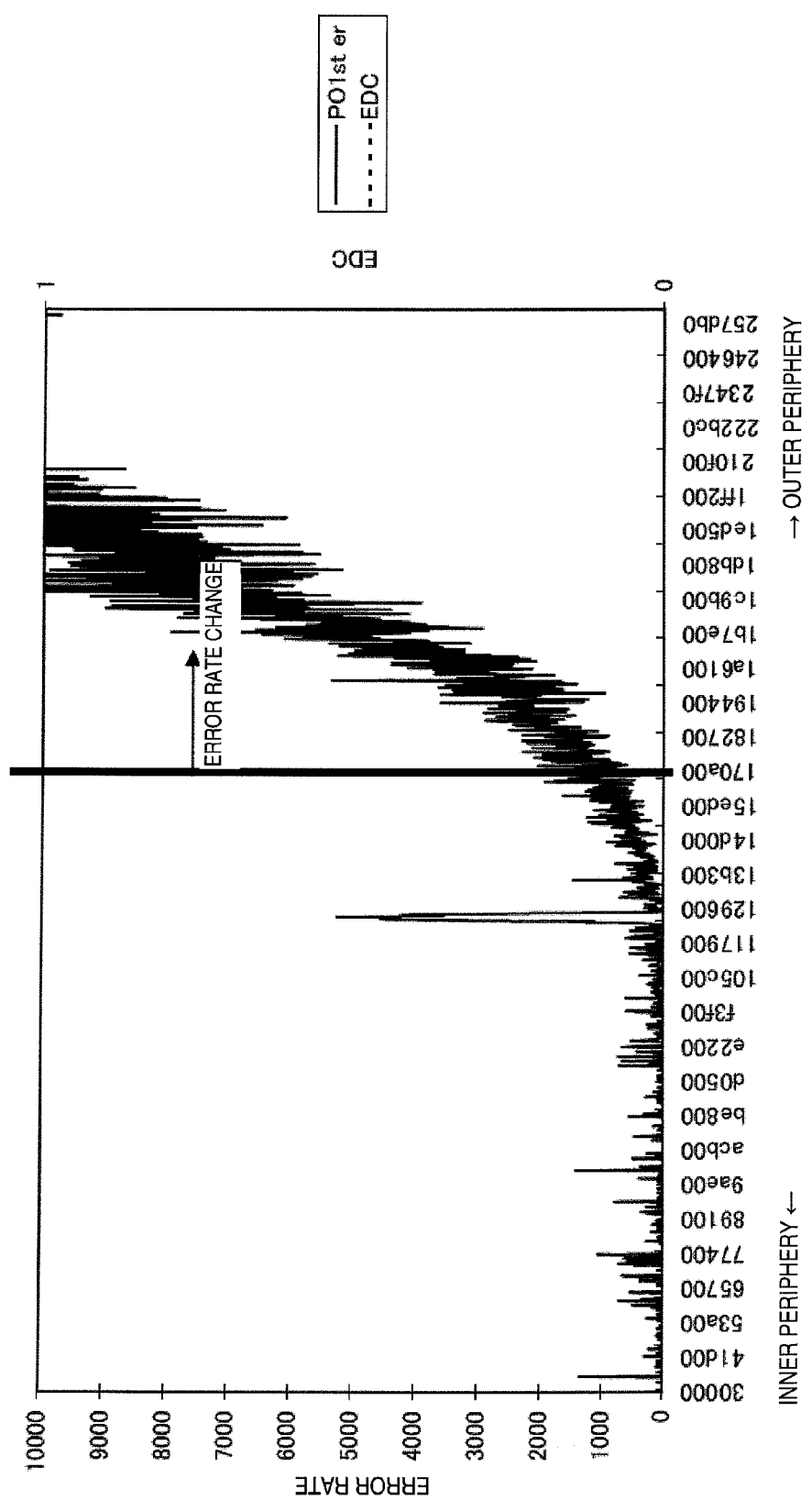
FIG. 5B is a graph showing a relationship between an error rate and the address of the optical disk.

Next, FIGS. 5A and 5B show the recording characteristics of the optical disk 102 whose recording characteristics are different on the inner and outer peripheries. FIG. 5A shows the change in the modulation value in the radial direction when recording was performed at the optimal recording power set by the OPC processing. FIG. 5B shows the error rate when recording was performed at the optimal recording power set by the OPC processing. The left end of the graphs in FIGS. 5A and 5B shows the recording characteristics at the innermost periphery, and the right end shows the recording characteristics at the outermost periphery, since with a DVD-RW, recording is performed starting at the inner periphery and moving outward from there.

In FIG. 5A, the modulation value is approximately 0.65 at the innermost periphery where recording begins (6500 in FIG. 5A). As recording proceeds and the track being recorded shifts toward the outer periphery, the modulation value drops below 0.50 near the center in the radial direction of the track (5000 in FIG. 5A), and near the outermost periphery, the degree of modulation is almost always below 0.50 (5000 in FIG. 5A). In FIG. 5B, the increase in the error rate suddenly takes on a steep slope near the thick vertical line drawn in FIGS. 5A and 5B. If the error rate worsens, then the jitter value also worsens. As a result, the quality of the video/audio data outputted from the optical disk device 100 is adversely affected, and it ends up being impossible to reproduce video/audio. Judging from the relationship, a modulation lower limit value (e.g., first threshold value) is set at 0.50. The modulation lower limit value sets the threshold of modulation with respect to effect had by the optical disk device 100 itself, such as slight variance in the oscillation frequency of the laser device, an imbalance in the focus servo of the light beam, deviation between the light beam emitting lens face of the optical pickup 104 in which the laser device is installed and the disk face of the optical disk 102 (this is called tilt), variance in the recording pulse waveform of the light beam, and so forth.

Figure 6A:
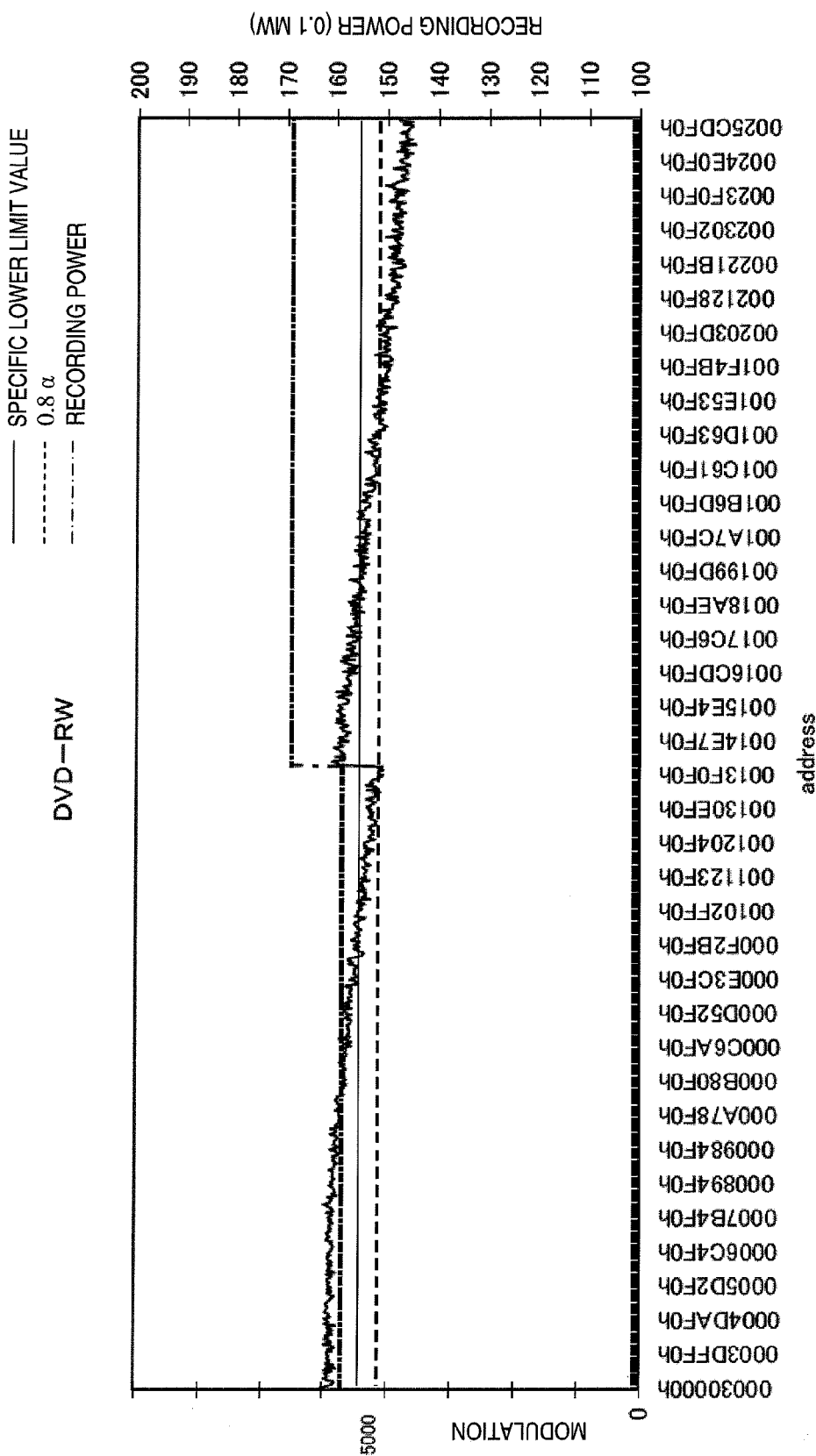
FIG. 6A is a graph showing a relationship between the modulation value and the address of the optical disk.
Figure 6B:
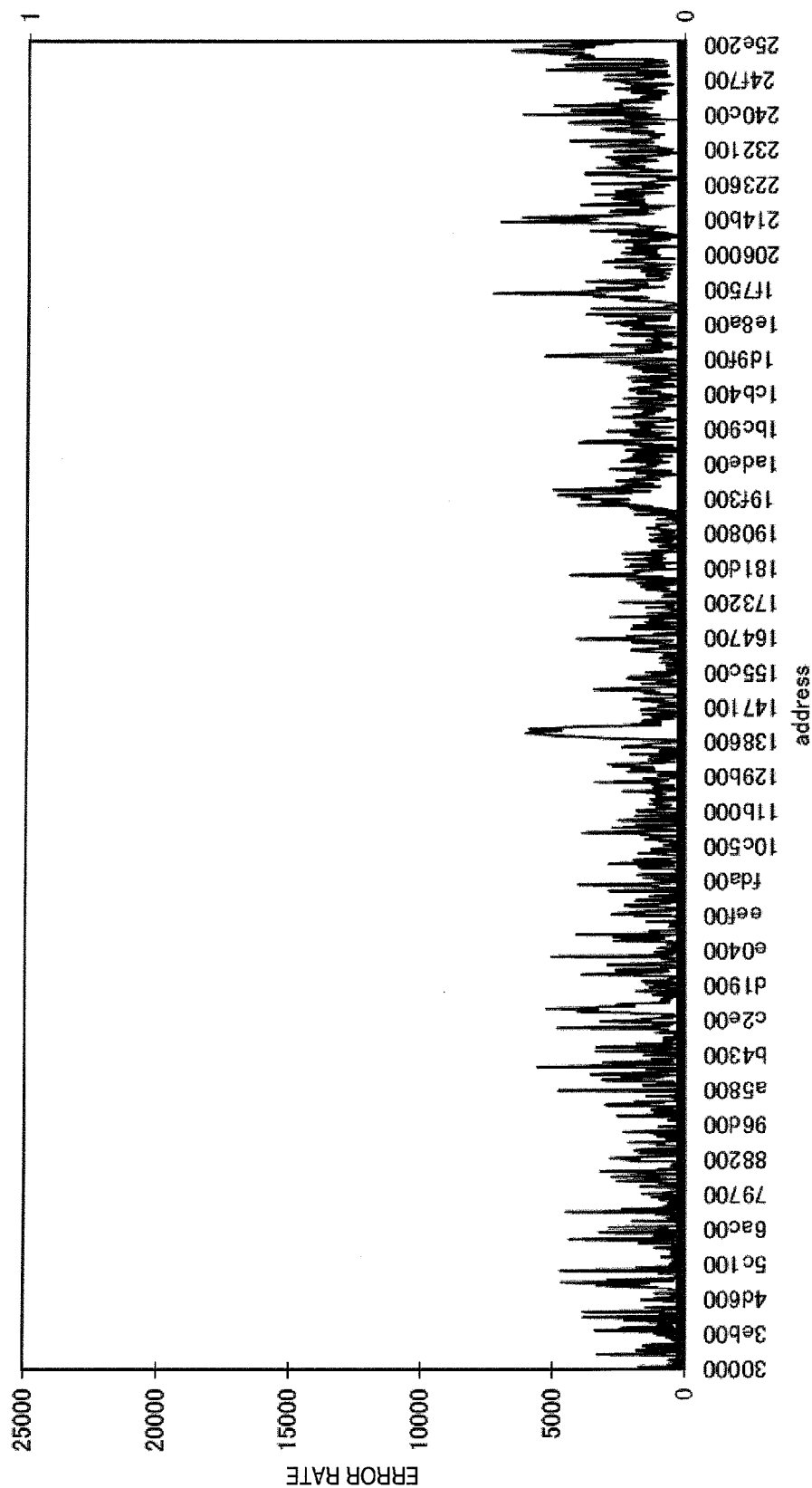
FIG. 6B is a graph showing a relationship between the error rate and the address of the optical disk.

Next, FIGS. 6A and 6B show the recording characteristics when recording is performed on the optical disk 102 whose recording characteristics are different on the inner and outer peripheries. First of all, recording is performed for one track of the optical disk 102 at the optimal recording power set by the OPC processing. The average value α for modulation of the one track is calculated. The average value α serves as an index for an ideal modulation value with respect to both the optical disk device 100 and the optical disk 102 currently being recorded to. The modulation value α is then stored in the memory 107. The modulation lower limit value at which the error rate worsens is preset at 0.50, and the modulation lower limit value is also stored in the memory 107.

Once the user begins recording, the average value β for modulation is calculated at specific track intervals. Specifically, the average value β is calculated as an average value of the modulation of a track of the optical disk 102 that is located away from the one track by the specific track interval. As a result, as recording moves from the inner periphery toward the outer periphery, the change in the modulation value in the radial direction is detected. The horizontal axis of the FIGS. 6A and 6B show the address of the track of the optical disk 102. The modulation value β is calculated for every specific track. Then, recording is performed by adding a specific power (e.g., predetermined power) of 1 mW to the optimal recording power when the average value β at the specific track interval currently being recorded drops below the modulation lower limit value of 0.50, and drops below a product of multiplying a ratio (e.g., predetermined ratio) of 0.8 by the average value α for the one track.

In FIG. 6A, the solid horizontal line is the modulation lower limit value of 0.50, the broken line is the product (0.8α) of multiplying the ratio of 0.8 by the average value α for the one track, and the one-dot chain line is the recording power. Recording starts from the inner periphery and as it moves toward the outer periphery, the modulation value decreases. At the track whose address is 000EC7F0h, the modulation value drops below the lower limit value of 0.50, and then at the track whose address is 0013D0F0h, the modulation value drops below 0.8α. At this point a command is issued under the control of the CPU 101 to the laser diode control circuit 110 so that 1 mW is added to the optimal recording power. According to this command, the laser diode control circuit 110 adds 1 mW to the optimal recording power, and recording is performed to the optical disk 102 at the corrected recording power.

As shown in FIG. 6B, amplitude of the error rate is held substantially constant from the inner periphery of the optical disk 102 to the outer periphery, and the continual worsening of the error rate at a steep slope as shown in FIG. 5B is avoided. Thus, the specific ratio is set to 0.8 based on the relationships in FIGS. 6A and 6B. When the specific ratio is set, the point at which the modulation value decreases 20% from the original ideal modulation value of the optical disk 102 can be determined to be the point at which normal recording is impossible. Thus, the effect of variance had by the optical disk 102 itself can be reduced.

Figure 7:
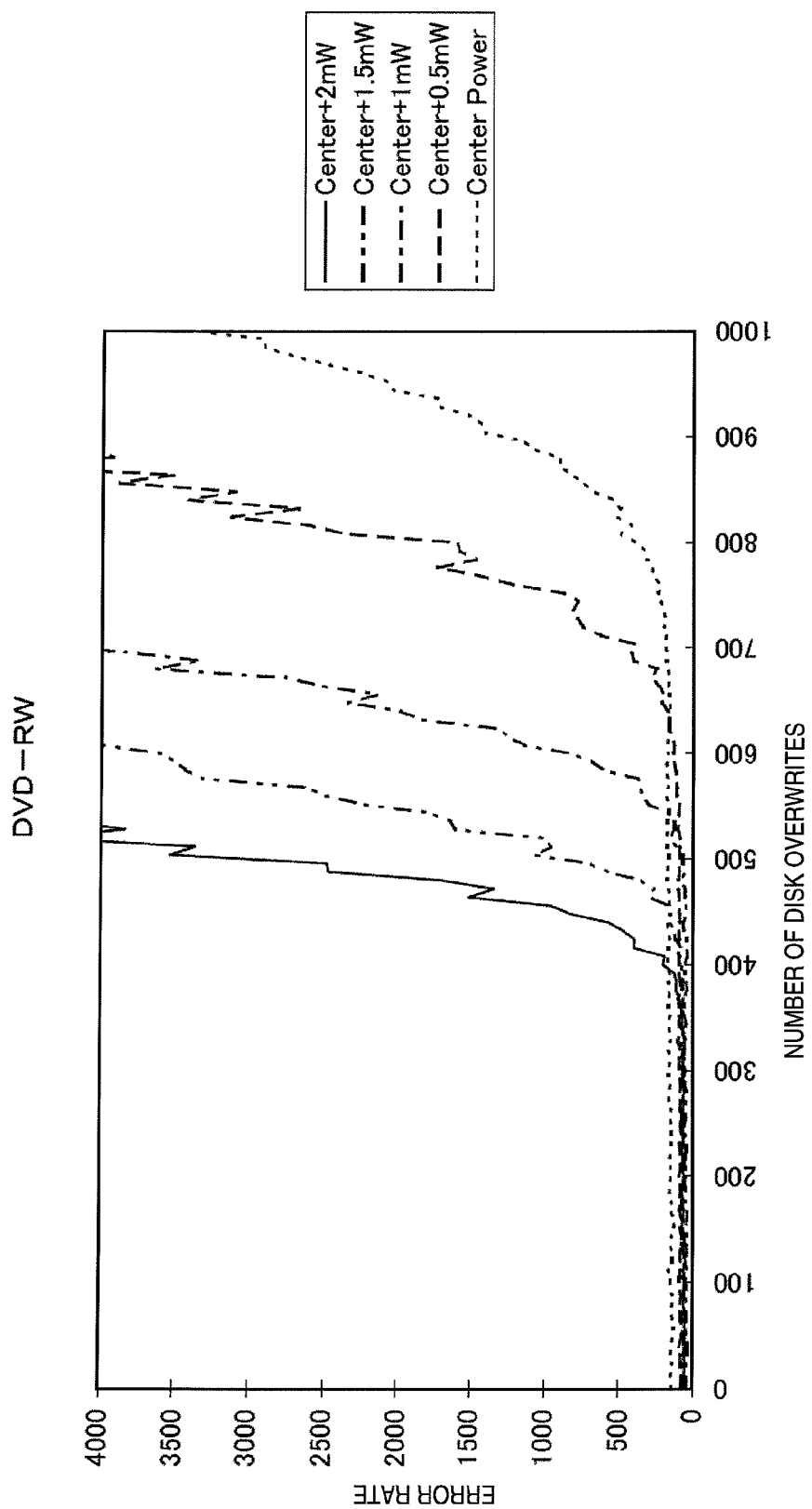
FIG. 7 is a graph showing a relationship between the error rate and the number of times overwriting has been performed by the optical disk device illustrated in FIG. 1.

FIG. 7 is a graph of the error rate and the number of times the optical disk 102 has been overwritten. With an overwritable optical disk, recording characteristics tend to suffer every time overwriting is repeated. The higher is the recording power, the more the recording characteristics tend to deteriorate. In FIG. 7, the broken line is the optimal recording power determined by the OPC processing, the dotted line is the recording power when 0.5 mW is added to the optimal recording power, the one-dot chain line is the recording power when 1.0 mW is added to the optimal recording power, the two-dot chain line is the recording power when 1.5 mW is added to the optimal recording power, and the solid line is the recording power when 2.0 mW is added to the optimal recording power. These lines show the changes in the error rate under repeated overwriting at these various power levels. As shown in FIG. 7, the greater is the recording power added to the optimal recording power, the more sharply the error rate worsens at a smaller number of overwrites.

With the optical disk device 100, the specific power to be added is set to 1 mW after taking into consideration that the error rate of the number of overwrites worsens depending on the information of the recording power. This is because guaranteeing 600 overwrites is the goal for quality reliability of the optical disk device 100.

Figure 8:
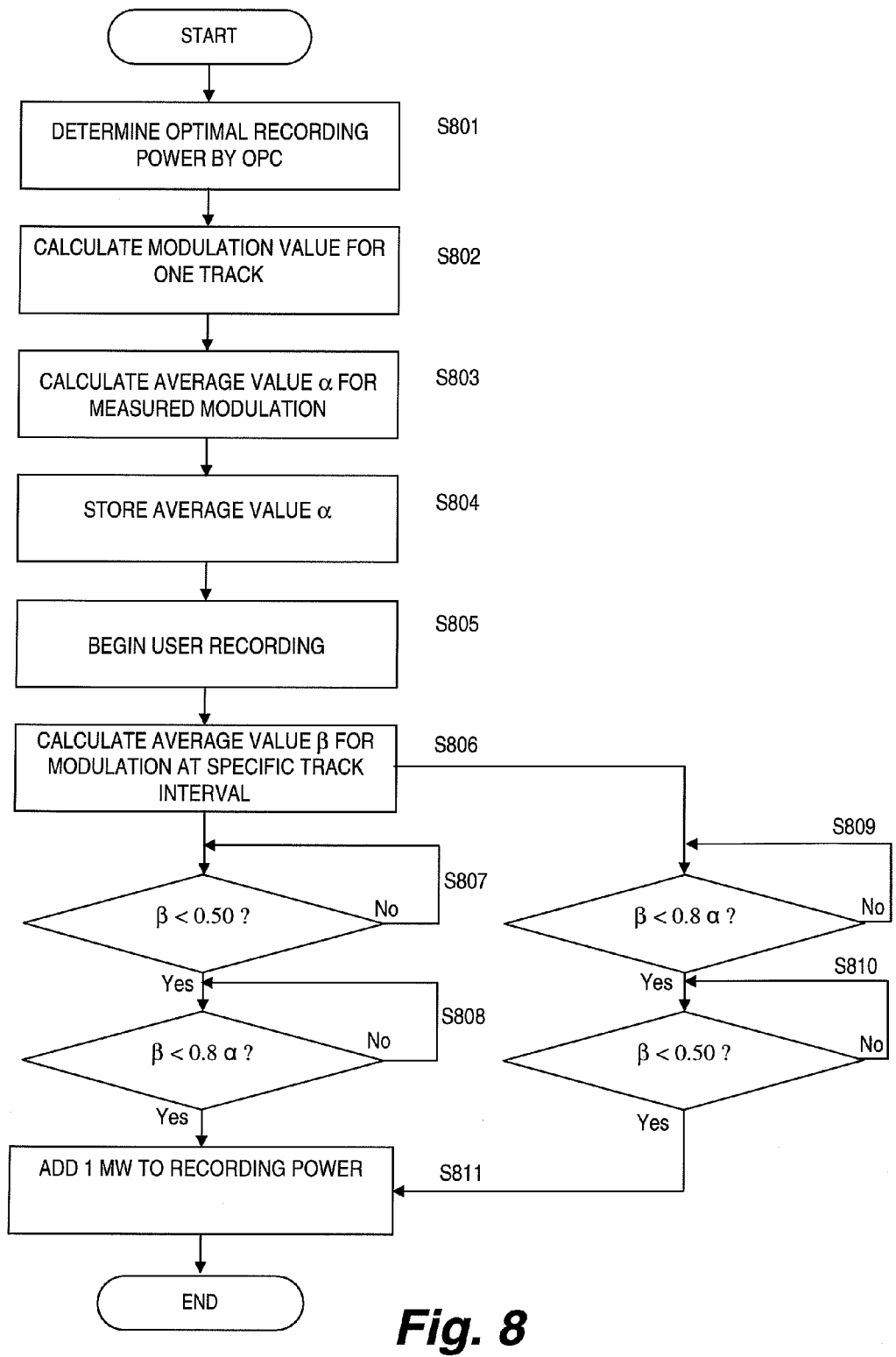
FIG. 8 is a flowchart illustrating an operation for laser recording power control performed in the optical disk device illustrated in FIG. 1.

The series of operations of the optical disk device 100 will now be described through reference to FIG. 8. First, the optimal recording power is determined by the OPC processing (step S801). Next, recording for the one track of the optical disk 102 is performed at the optimal recording power, and then the modulation value is measured for the one track by performing reproduction (step S802). Next, the average value α for the modulation measured in step S802 is calculated under the control of the power correction portion 152 of the CPU 101 (step S803), and is recorded to the memory 107 (step S804). The user then begins recording. In other words, a command to commence the recording is inputted from the interface 113 and the CPU 101 receives the command (step S805). The average value β for the modulation is calculated at the specific track interval (step S806).

The CPU 101 monitors whether or not the average value β has dropped below the previously stored lower limit value of 0.5 (step S807). If the average value β has dropped below 0.5, then the CPU 101 monitors whether or not the average value β has dropped below 0.8α (step S808). In step S808, if the average value β has dropped below 0.8α, then recording is performed by adding 1 mW to the optimal recording power (step S811).

The monitoring by the CPU 101 here is performed in parallel. After step S806, the CPU 101 also monitors whether or not β has dropped below 0.8α (step S809), and in step S809 if β has dropped below 0.8α, then the CPU 101 monitors whether or not β has dropped below the lower limit value of 0.5 (step S810). In step S810 if beta has dropped below the lower limit value of 0.5, then the recording is performed by adding 1 mW to the optimal recording power (step S811). Depending on the individual characteristics of the optical disk 102, either 0.8α<β or that 0.8α>β is true. However, in both cases, monitoring is performed in parallel so as to correct to the corrected recording power.

Thus, when the average value β drops below the specific modulation lower limit value, and drops below the product of multiplying the specific ratio by the average value α for the one track of the optical disk 102, recording is performed with the corrected recording power. The specific modulation lower limit value is a threshold with respect to variance had by the optical disk device 100 itself. Furthermore, the product of multiplying the specific ratio by the ideal average value α is a threshold with respect to variance in the modulation value in the radial direction had by the optical disk 102 itself. If the specific power is added on the optimal recording power when the average value β drops below both the threshold with respect to the optical disk device 100 and the threshold with respect to the optical disk 102, then the variance caused by both the optical disk device 100 and the optical disk 102 will have no effect. As a result, it will be possible to perform recording in the optimal state.

With the optical disk device 100, correction of the optimal recording power is only performed once while recording to the optical disk 102 is performed from the inner periphery to the outer periphery. However, if there is a reduction below the conditions after the optimal recording power has been corrected once, it is possible to correct the corrected recording power again, such as a plurality of times during recording to the same optical disk 102. However, as the number of times the recording power is corrected increases, the recording power rises and the error rate due to the number of overwrites also increases. Thus, the design should take into account guaranteeing the required number of overwrites for the optical disk device 100.

Also, with the optical disk device 100, the modulation lower limit value is set at 0.50, and the specific ratio is set at 0.8. However, these values can be suitably adjusted according to the specifications at the design stage of the optical disk device 100. As to the specific track interval at which β is calculated, a smaller track interval is better. However, the smaller is the track interval, the more times β will have to be calculated. Thus, it is preferable to use the CPU 101 that is capable of high-speed processing to perform the calculations within a limited time. When the optical disk device 100 includes a relatively inexpensive circuit structure, without sacrificing the effect of the optical disk device 100, the track interval is preferably set to between 100 and 1000.

With the optical disk device 100, the modulation value is measured in order to monitor the recording characteristics in the area where recording is actually performed. The modulation value is a value expressing the relationship between the reflectance of the lands and grooves in the recording layer, and serves as an index for evaluating the recording characteristics. Furthermore, with the optical disk device 100, the recording power of the light beam is corrected so as to improve the modulation value that is monitored simultaneously as recording is performed. Thus, the quality of recording to the optical disk 102 by correcting the optimal recording power while conducting actual recording at the optimal recording power determined by the OPC and monitoring the state of the recording.

With the optical disk device 100, the effects of both variance in the optical disk device 100 itself and changes to the modulation value of the inner and outer peripheries of the optical disk 102 are absorbed, allowing information to be recorded at the corrected recording power.

With the optical disk device 100, recording is performed for the one track of the optical disk 102 at the optimal recording power. The average value $\alpha$ of the modulation for the one track is stored in the memory 107. Since the one track is in the first recording region of the user's recording area, with DVD specifications, for example, it is located at the innermost periphery, and the recording characteristics are in the best state. By calculating the average value $\alpha$ for the modulation of the one track, an index for the ideal modulation value with respect to the optical disk 102 currently being recorded to is obtained. Then, once the user begins recording the desired video/audio data, the average value $\beta$ of the modulation at the specific track interval is calculated while performing reproduction simultaneously with recording. As a result, as recording proceeds from the inner periphery toward the outer periphery, changes in the modulation value can be detected at the specific interval in the radial direction. When the average value $\beta$ at the specific track interval drops below the specific modulation lower limit value, and drops below the product of multiplying the specific ratio by the modulation value $\alpha$ for the one track of the optical disk 102, recording is performed with the specific power added onto the optimal recording power. The modulation lower limit value is a threshold with respect to variance had by the optical disk device 100 itself, and the product of multiplying the specific ratio by $\alpha$ (the ideal modulation value) is a threshold with respect to variance in the modulation value in the radial direction had by the optical disk 102 itself. Thus, if the specific power is added on when the average value $\beta$ drops below both the threshold with respect to the optical disk device 100 and the threshold with respect to the optical disk 102, then the variance caused by both the optical disk device 100 and the optical disk 102 will have no effect, and it will be possible to perform recording in the optimal state.

With the optical disk device 100, the specific modulation lower limit value is 0.5, the specific ratio is 0.8, and recording is performed with 1 milliwatt added onto the optimal recording power, the result of which is that recording can be performed at the corrected recording power even with the optical disk 102 whose recording characteristics differ between the inner and outer peripheries.

The optical disk device 100 can be an optical disk device that records and reproduces to and from an overwritable optical disk. In particular the optical disk device 100 can be an optical disk device for stably recording to an optical disk whose recording characteristics vary between the inner and outer peripheries, such as a CD-R/RW drive, a DVD-R/RW drive, a DVD+R/RW drive, a DVD-RAM drive, or a DVD+RAM drive.

Second Embodiment

Figure 10:
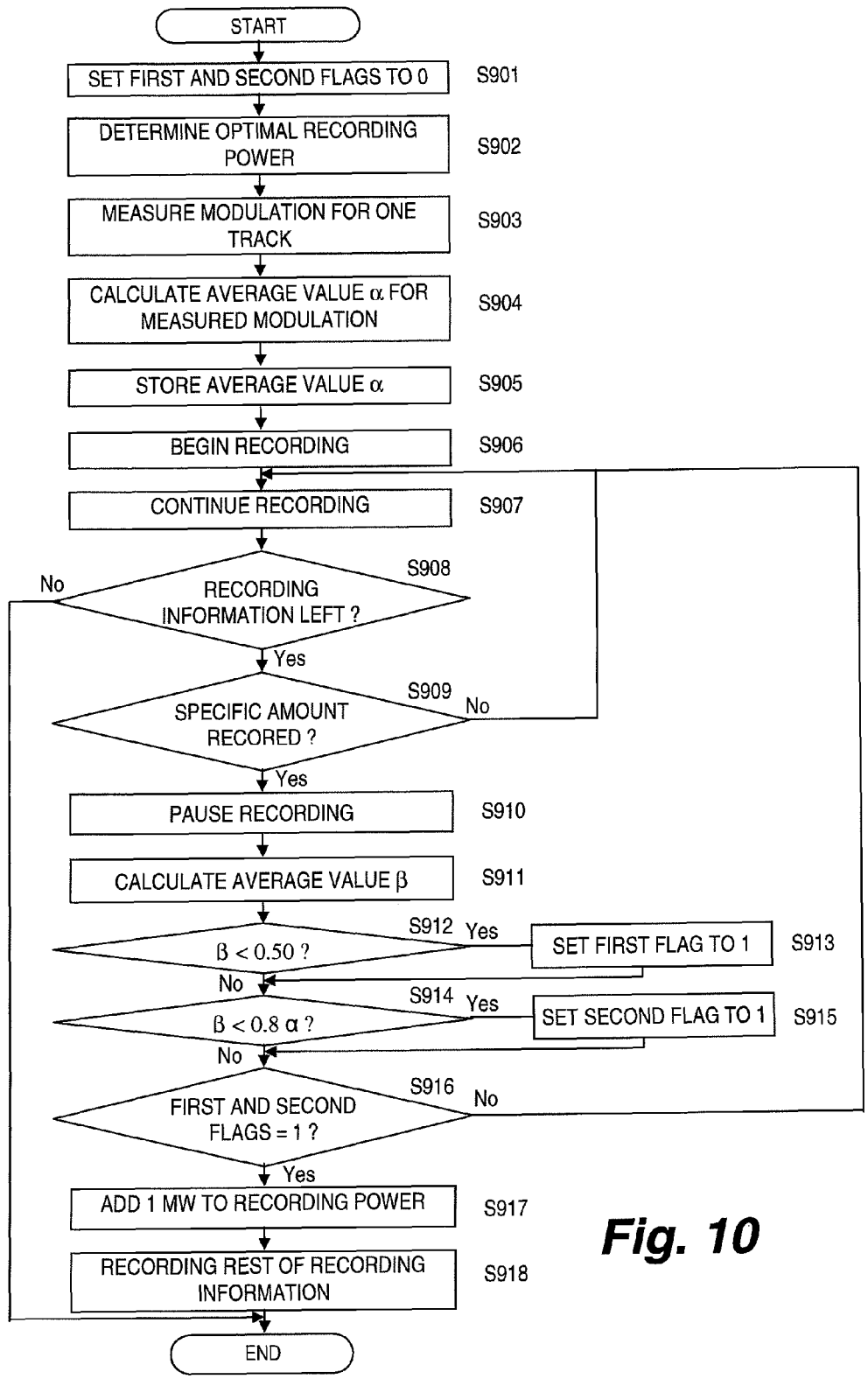
FIG. 10 is a flowchart illustrating an operation for laser recording power control performed in an optical disk device in accordance with a second embodiment of the present invention.

Referring now to FIG. 10, an optical disk device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The series of operations of the optical disk device 100 described through reference to FIG. 8 can be as follows.

As shown in FIG. 10, first, a first flag and a second flag stored in the memory 107 are set to 0 (step S901). The optimal recording power is determined by the OPC processing (step S902). Next, recording for the one track of the optical disk 102 is performed at the optimal recording power, and then the modulation value is measured for the one track by performing reproduction (step S903). Next, the average value $\alpha$ for the modulation measured in step S903 is calculated under the control of the power correction portion 152 of the CPU 101 (step S904), and is recorded to the memory 107 (step S905). The user then begins recording. In other words, a command to commence the recording is inputted from the interface 113 and the CPU 101 receives the command (step S906). While the recording is performed (step S907), the CPU 101 determines whether or not the information to be recorded (e.g., recording information) is still left (step S908). If the CPU 101 determines that all of the recording information has been recorded (No in step S908), then the CPU 101 ends the recording operations (step S919). If the CPU 101 determines that the recording information is still left (Yes in step S908), then the CPU 101 determines whether or not a specific amount of the recording information has been recorded (step S909). With the optical disk device 100, the recording information is divided into a plurality of sub data having the specific amount, and the plurality of the sub data is serially recorded on the optical disk 102. Specifically, when the total amount of the recording information is 10000 hex, the recording information is divided into 16 sub data the amount of which is 1000 hex, and the recording process is repeated 16 times to record the recording information. If the CPU 101 determines that the specific amount of the recording information has not been recorded (No in step S909), then the process returns to step S907. If the CPU 101 determines that the specific amount of the recording information has been recorded (Yes in step S909), then the CPU 101 pauses the recording (step S910), and calculates the average value $\beta$ for the modulation for the last track on which the sub data has been recorded (step S911). Furthermore, the CPU 101 monitors whether or not the average value $\beta$ has dropped below the previously stored lower limit value of 0.5 (step S912). If the average value $\beta$ has dropped below 0.5 (Yes in step S912), then the CPU 101 sets the first flag to 1 (step S913) and the CPU 101 further monitors whether or not the average value $\beta$ has dropped below 0.8$\alpha$ (step S914). In step S914, if the average value $\beta$ has dropped below 0.8$\alpha$ (Yes in step 914), then the CPU 101 sets the second flag to 1 (step S915). Furthermore, the CPU 101 determines whether or not both of the first and second flags are set to 1 (step S916). If the CPU 101 determines that at least one of the first and second flags is still set to 0 (No in step S916), then the process returns to step S907. If the CPU 101 determines that both of the first and second flags are set to 1 (Yes in step S916), then 1 mW is added to the optimal recording power (step S917) and recording of the rest of the recording information is performed with the corrected recording power (step S918).

With the optical disk device 100, when one of the first and second flags is set to 1 during recording of a sub data, the status of the first and second flags is succeeded to the recording of the next sub data. Then, when the both of the first and second flags are set to 1, the specific power is added.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of an optical disk device equipped with the present invention. Accordingly, these terms, as utilized to describe the present invention should be interpreted relative to an optical disk device equipped with the present invention as used in the normal operating position.

While selected embodiments have been chosen to illustrate the present invention, it will be apparent to those skilled in the art from these disclosures that various changes and modifications can be made herein without departing from the scope of the invention as defined in the appended claims. Furthermore, the foregoing descriptions of the selected embodiments according to the present invention are provided for illustration only, and not for the purpose of limiting the invention as defined by the appended claims and their equivalents.

What is claimed is:

1. An optical disk device comprising:
   a test recording portion configured to record test information on a predetermined test recording area of an optical disk;
   a power control portion configured to determine a first recording power to record recording information to the optical disk based on the test information recorded by the test recording portion;
   a recording portion configured to record the recording information to the optical disk at the first recording power; and
   a power correction portion configured to calculate a first average of modulation of the recording information recorded on a first track of the optical disk at the first recording power and a second average of modulation of the recording information recorded on a second track of the optical disk at the first recording power with the second track of the optical disk being located away from the first track of the optical disk in a radial direction of the optical disk, and the power correction portion further configured to increase the first recording power to a second recording power so that the recording portion records the recording information at the second recording power when the second average of the modulation drops below a first threshold value that is preset and drops below a second threshold value that is calculated based on the first average of the modulation.

2. The optical disk device according to claim 1, wherein the power correction portion repeatedly calculates the second average of the modulation of the recording information at a predetermined track interval of the optical disk in the radial direction of the optical disk.

3. The optical disk device according to claim 2, further comprising
   a memory portion storing the first threshold value that is set according to a manufacturing tolerance for the optical disk device,
   the power correction portion being further configured to acquire the first threshold value from the memory portion and to determine that the second average of the modulation drops below the first threshold value.

4. The optical disk device according to claim 3, wherein the power correction portion calculates the first average of the modulation and stores the first average of the modulation into the memory portion.

5. The optical disk device according to claim 4, wherein the memory portion further stores a predetermined ratio that is set according to the manufacturing tolerance of the optical disk,
   the power correction portion being further configured to acquire the first average of the modulation and the predetermined ratio from the memory portion, to calculate the second threshold value by multiplying the predetermined ratio by the first average of the modulation, and to determine that the second average of the modulation drops below the second threshold value.

6. The optical disk device according to claim 5, wherein the power correction portion increases the first recording power to the second recording power by adding a predetermined power to the first recording power.

7. The optical disk device according to claim 6, wherein the test recording portion is further configured to progressively change a test recording power at a predetermined interval to record the test information on the predetermined test recording area of the optical disk.

8. The optical disk device according to claim 7, wherein the first threshold value is set to 0.5, the predetermined ratio is set to 0.8, and the predetermined power is set to 1 milliwatt.

9. The optical disk device according to claim 8, wherein the recording portion includes a laser diode being configured to emit a laser beam, and an objective lens being arranged to converge the laser beam on the optical disk to record the recording information.

10. A recording method for an optical disk device, comprising:
    recording test information on a predetermined test recording area of an optical disk;
    determining a first recording power to record recording information to the optical disk based on the test information;
    recording the recording information to the optical disk at the first recording power;
    calculating a first average of modulation of the recording information recorded on a first track of the optical disk at the first recording power and a second average of modulation of the recording information recorded on a second track of the optical disk at the first recording power with the second track of the optical disk being located away from the first track of the optical disk in a radial direction of the optical disk; and increasing the first recording power to a second recording power to record the recording information at the second recording power upon determining that the second average of the modulation drops below a first threshold value that is preset and drops below a second threshold value that is calculated based on the first average of modulation.

* * * * *